Figure 1:
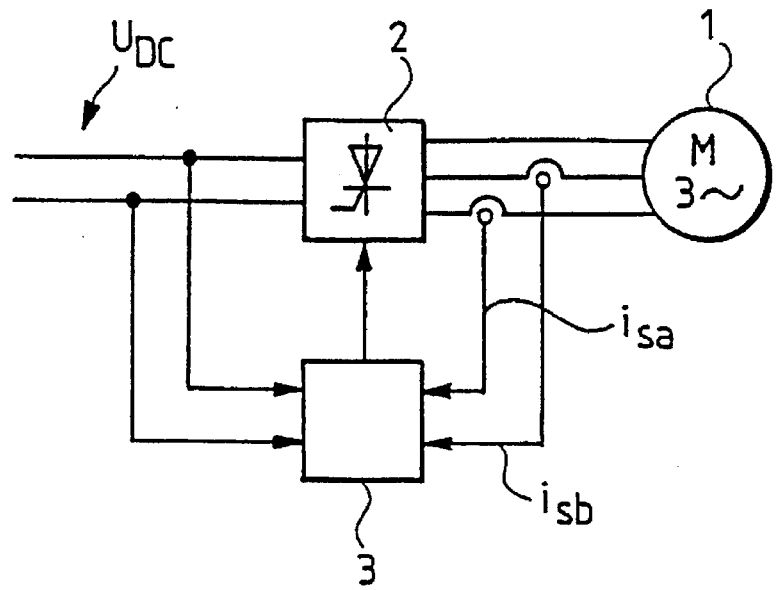

United States Patent [19]
Schroderus

[11] Patent Number: 5,654,624
[45] Date of Patent: Aug. 5, 1997

[54] METHOD OF STARTING AN ASYNCHRONOUS MACHINE

[75] Inventor: Petri Schroderus, Espoo, Finland

[73] Assignee: ABB Industry OY, Helsinki, Finland

[21] Appl. No.: 520,469

[22] Filed: Aug. 28, 1995

[30] Foreign Application Priority Data

Sep. 9, 1994 [FI] Finland ............................ 944179

[51] Int. Cl.$^6$ .................................................. H02P 11/00
[52] U.S. Cl. ............................ 322/39; 322/20; 318/805; 318/809
[58] Field of Search ............................ 318/805; 322/39

[56] References Cited

U.S. PATENT DOCUMENTS

| | | | |
|---|---|---|---|
| 3,824,437 | 7/1974 | Blaschke | 318/227 |
| 4,015,178 | 3/1977 | Phillot et al. | 318/227 |
| 4,499,413 | 2/1985 | Izosimov et al. | 318/802 |
| 4,678,248 | 7/1987 | Depenbock | 318/805 |
| 4,883,973 | 11/1989 | Lakey et al. | 290/31 |
| 4,904,920 | 2/1990 | Rufer | 318/800 |
| 5,105,141 | 4/1992 | Ernest | 318/805 |
| 5,334,923 | 8/1994 | Lorenz et al. | 318/805 |

FOREIGN PATENT DOCUMENTS

| | | |
|---|---|---|
| 469177A | 10/1993 | European Pat. Off. . |
| 3438504 | 9/1993 | Germany . |
| 3543983A | 9/1993 | Germany . |
| 2093288 | 9/1993 | United Kingdom . |

*Primary Examiner*—Steven L. Stephan
*Assistant Examiner*—Nicholas Ponomarenko
*Attorney, Agent, or Firm*—Watson Cole Stevens Davis, P.L.L.C.

[57] ABSTRACT

The invention relates to a method of starting an asynchronous machine irrespective of whether the rotor of the machine is rotating or not when the machine is supplied by an inverter provided with a separate moment and flux or moment and magnetizing current control, which is faster than the time constants of the asynchronous machine. According to the invention, zero moment is set as a target for the control, a voltage is supplied to the stator of the machine by the inverter, a stator current vector and a stator flux generated by the voltage is determined, an estimate of that vector or some other quantity comparable to the stator flux is determined, a moment caused by the stator flux vector and the stator current vector is determined and information of the moment is supplied to the control, which tries to zero the caused moment by making the stator flux and a rotor flux generated thereby cophasal, thus synchronizing the supply frequency of the inverter with a possible rotation of the machine rotor.

4 Claims, 1 Drawing Sheet

METHOD OF STARTING AN ASYNCHRONOUS MACHINE

The present invention relates to a method of starting an asynchronous machine irrespective of whether the rotor of the machine is rotating or not when the machine is supplied by an inverter provided with a separate moment and flux or moment and magnetizing current control, which is faster than the time constants of the asynchronous machine. Accordingly, not even a rough estimation of the speed of rotation of the rotor is required for the application of the method. The method is thus suitable for being used in situations when the rotor is rotating at the moment of starting command already or when no definite knowledge of the rotary motion of the rotor exists. An additional starting point of the method is that there is no significant residual flux in the machine.

Methods of starting a squirrel cage machine in a situation when the rotor without residual flux is rotating are known for instance from German Patent 32 02 906 and German Offenlegungsschrift 35 43 983. In these methods, a frequency ramp is used, by means of which the frequency of the rotor is scanned. The methods typically require hundreds of milliseconds of time and they are not reliable at low frequencies. Further, a method is known from European Published Application 04 69 177, in which the rotor is supposed to have an observable remanence flux, by means of which the rotor frequency is found. In this method, the calculation time is at least twice a fundamental period of the residual flux and the method is not working at low frequencies of less than 1 Hz, for instance.

The object of the present invention is to provide a method of starting an asynchronous machine, in which method no residual flux is needed and in which a few milliseconds to some twenty or thirty milliseconds are required for finding the frequency of the rotor, which means that this method is considerably faster than the old methods. Additionally, the method shall also be suitable for situations when the rotor is rotating slowly.

The above-mentioned objects can be achieved by means of the method according to the invention, which method is characterized in that it comprises steps of setting zero moment as a target for the control, supplying a voltage to the stator of the machine by the inverter, determining a stator current vector generated by the voltage, determining a stator flux vector generated by the voltage, an estimate of that vector or some other quantity comparable to the stator flux, determining a moment caused by the stator flux vector and the stator current vector and supplying an information of the moment to the control, which tries to zero the caused moment by making the stator flux and a rotor flux generated thereby cophasal, thus synchronizing the supply frequency of the inverter with a possible rotation of the rotor of the machine. In the method according to the invention, the control system of the inverter is thus utilized, which system in its conventional use controls the moment and flux or the moment and magnetizing current of the asynchronous machine. In the method according to the invention, such a control system is excited by supplying a current impulse to the machine, as a result of which impulse, with the machine possibly rotating, a moment is caused which can be controlled by the control system as desired, i.e. in the case of the present method towards zero moment, being a state in which the stator flux and the rotor flux are cophasal and in which the supply frequency of the inverter thus is synchronized with the possible rotation of the rotor.

The voltage to be supplied to the stator is preferably set in such a way that the stator current generated thereby is close to the rated value of the stator current so that the stator flux and the rotor flux to be generated will be big enough.

Figure 2:
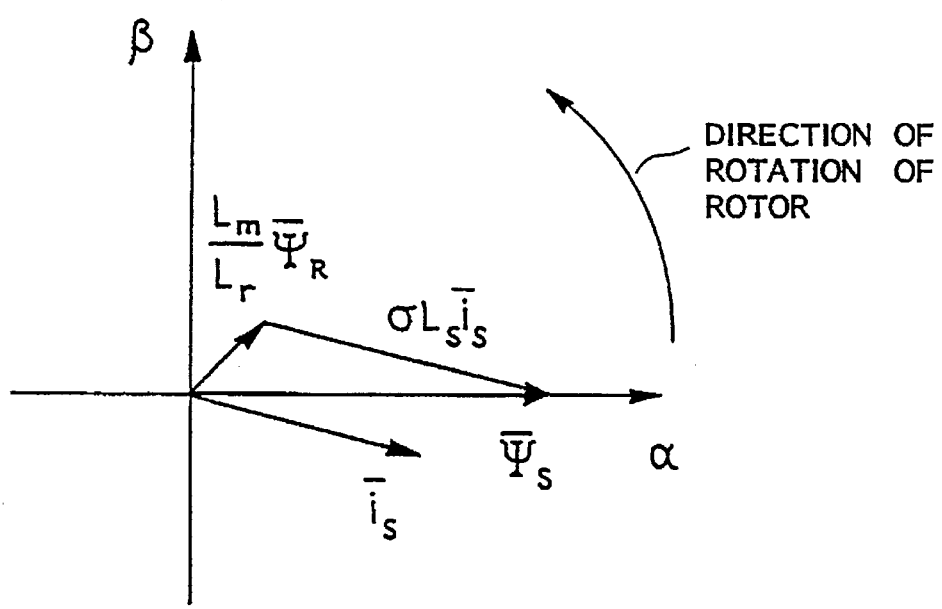

In the following, the method according to the invention and its theoretical background will be described in more detail by referring simultaneously to the enclosed drawing, in which FIG. 1 shows schematically by way of example a structure of an equipment suitable for realizing the method according to the invention and FIG. 2 shows an indicating diagram of vector quantities produced at the application of the method of the invention.

In the method according to the invention, an information of the moment caused in a squirrel cage machine is required. It can be calculated as follows $$T_m = C \cdot (\overline{\psi}_s \times \overline{i}_s) \tag{1}$$

where $T_m$ = electric moment
$C$ = constant coefficient
$\overline{\psi}_s$ = stator flux
$\overline{i}_s$ = stator current Accordingly, to be able to calculate the moment to be caused, it is necessary to know, besides the measured stator current, also the stator flux or some other quantity comparable to that. The stator flux can be calculated by means of the following generally known differential and current equations of the stator and the rotor, which equations expressed in a stator coordinate system are:

$$\overline{u}_s = R_s \overline{i}_s + \frac{d\overline{\psi}_s}{dt} \tag{2}$$

$$0 = R_r \overline{i}_r + \frac{d\overline{\psi}_r}{dt} - j\omega_m \overline{\psi}_r \tag{3}$$

$$\overline{\psi}_s = L_s \overline{i}_s + L_m \overline{i}_r \tag{4}$$

$$\overline{\psi}_r = L_r \overline{i}_r + L_m \overline{i}_s \tag{5}$$

where $\overline{U}_s$ = stator voltage
$R_s$ = stator resistance
$\overline{\Psi}_r$ = rotor flux
$\overline{i}_r$ = rotor current
$\omega_m$ = mechanical speed of rotation
$R_r$ = rotor resistance
$L_s$ = stator inductance
$L_r$ = rotor inductance
$L_m$ = main inductance From the above-mentioned formulas, the following formula can be derived for the derivative of the rotor flux (slip frequency = 0):

$$\frac{d\overline{\psi}_r}{dt} = \frac{\frac{L_m}{L_s} \cdot \overline{\psi}_s - \overline{\psi}_r}{\sigma \tau_r} \tag{6}$$

where $\tau_r = \frac{L_r}{R_r}$ = rotor time constant $\sigma = 1 - \frac{L_m^2}{L_s L_r}$ = leakage coefficient FIG. 1 shows a principal block diagram of a system suitable for realizing the method according to the invention.

Therein, a three-phase asynchronous machine 1 is supplied by an inverter 2, which is connected to a direct voltage intermediate circuit $U_{DC}$. The inverter 2 is controlled by a control system 3, which is, according to the invention, supposed to comprise a separate moment and flux or moment and magnetizing current control, which is faster than the time constants of the machine. As measured values for the control system 3, current is measured from two phases going into the machine 1. These currents are indicated by references $i_{sa}$ and $i_{sb}$ in FIG. 1. On the basis of these two current values, it is possible to determine a stator current vector $\bar{i}_s$ going to the machine. Further, the voltage of the direct voltage intermediate circuit $U_{DC}$ is measured. On the basis of the voltage of this direct voltage intermediate circuit and switch positions of the inverter 2, the control system 3 is capable of determining the stator voltage acting in the stator of the machine and from that, e.g. based on an integration of the stator voltage, the stator flux acting in the machine. Naturally, all generally known computational methods of determining the stator flux, an estimate thereof or some quantity comparable to the stator flux, such as rotor flux or air gap flux, are possible at the implementation of the method according to the invention. The control system indicated by reference numeral 3 in FIG. 1 will not be described in greater detail in connection with this application, since it is of a type which is conventionally used in the field. However, it may be stated that such a control system is described in European Patent 01 79 356, for example.

When an asynchronous machine shall be started by utilizing the method according to the invention, zero moment is initially set as a target for the control system 3. Subsequently, a voltage is supplied by the inverter 2 to the stator of the machine 1. This voltage is supplied at such a level that it generates a stator current being close to the rated stator current of the motor 1. This stator current and the generation thereof are followed by means of current measurements to be carried out at least on two phases, as appears from FIG. 1. By means of these current values, it is possible to determine the stator current vector $\bar{i}_s$, which is required for the calculation of the moment according to equation 1. Simultaneously with the supply of stator voltage, the stator flux of the machine is determined for instance by means of the process mentioned above, and in this way, it is possible to calculate by equation 1 the moment to be caused in the machine. It may still be told about the control system 3 that if the fastest control loop therein controls the magnetizing current, a desired stator current can be given directly as a reference value for the magnetizing current. On the other hand, if the stator flux is controlled, a suitable reference value for the stator flux can be calculated by means of the desired stator current:

$$\bar{\Psi}_{ref} = \sigma L_s \bar{i}_{ref} \qquad (7)$$

where $\bar{\Psi}_{ref}$=reference value for stator flux $\bar{i}_{ref}$=desired stator current As stated above, at the starting of the machine, a calculation of the moment to be caused is also started by formula 1. If the rotor is not rotating, no moment will be caused, because there is no phase difference between the stator flux and the stator current, and accordingly, the cross product between them is zero. In this situation, the current supply to the stator may continue and the stator flux may be increased, until the motor is sufficiently magnetized and capable of carrying out the given moment reference. It is then possible to give the machine the desired moment reference and to move away from the zero moment reference required for the implementation of the starting method according to the invention.

On the other hand, if the rotor is rotating at the starting of the motor according to the method of the invention, a moment is also caused. This is based on the fact that at the rotation of the rotor an angle is produced between the stator current vector and the stator flux vector, on account of which angle their cross product according to formula 1 is not zero any longer. FIG. 2 shows this situation when the stator flux has caused a small rotor flux according to formula 6, which flux turns at the rotation of the rotor and causes a difference in angle between the stator flux and the rotor flux. However, since the control system has been given zero moment as a reference, the control tries to compensate for the caused moment by controlling the stator flux onto the rotor flux. In this way the stator flux shoots to the speed of rotation of the rotor flux. The stator flux reaches even high frequencies without delays, since it has no inertia.

An observable moment is caused the faster the rotor rotates and the smaller the time constant of the rotor is. From formula 6 is seen that, at typical rotor time constants, the rotor flux has time to increase so much that a generation of moment can be observed so fast that the machine does not pass the breakover point, not even at high frequencies. The moment value after which the stator flux will be moved cannot be zero, however, because errors always occur at current measurement, which errors again appear at the estimate of moment according to formula 1. It is therefore important that the moment caused by a real rotating rotor flux distinguishes from moment noise caused by errors in current measurement. This is achieved expressly in such a way that the current to be supplied to the stator at the beginning of the method is high enough and the stator and rotor fluxes generated in this way are also so strong that measurement errors can be reliably avoided.

The method according to the invention is characterized in that the squirrel cage machine is fully controllable immediately after the stator current and the stator flux have been generated. However, the moment to be used has to be limited because of the risk of passing the breakover point, and the rated moment cannot be used until the stator flux has been raised up to the rated one.

I claim:

1. Method of starting an asynchronous machine irrespective of whether the rotor of the machine (1) is rotating or not when the machine is supplied by an inverter (2) provided with a separate moment and flux or moment and magnetizing current control (3), which is faster than the time constants of the asynchronous machine, c h a r a c t e r i z e d in that the method comprises the steps of setting zero moment as a target for the control (3), supplying a voltage to the stator of the machine by the inverter (2), determining a stator current vector ($\bar{i}_s$) generated by the voltage, determining a stator flux vector ($\bar{\Psi}_s$) generated by the voltage, an estimate of that vector or some other quantity comparable to the stator flux, determining a moment ($T_m$) caused by the stator flux vector ($\bar{\Psi}_s$) and the stator current vector ($\bar{i}_s$) and supplying an information of the moment ($T_m$) to the control, which tries to zero the caused moment by making the stator flux ($\bar{\Psi}_s$) and a rotor flux $\bar{\Psi}_r$ generated thereby cophasal, thus synchronizing the supply frequency of the inverter with a possible rotation of the rotor of the machine.

2. Method according to claim 1, characterized in that the voltage to be supplied to the stator is set in such a way that the stator current ($i_s$) generated thereby is close to its rated value.

3. Apparatus for starting an asynchronous machine irrespective of whether the rotor of the machine is or is not rotating, comprising:

an inverter including at least one of a separate moment and flux or moment and magnetizing current control, which is faster than the time constants of the asynchronous machine, and supplying a voltage to the stator of the machine;

means for controlling the inverter and determining: (1) zero moment as a target for the control, (2) a stator current vector generated by the voltage, (3) at least one of a stator flux vector generated by the voltage, an estimate of said vector and some other quantity comparable to the stator flux, (4) a moment caused by the stator flux vector and the stator current vector;

supplying data of the moment to said means for controlling; and said means for controlling attempting to zero the caused moment by making the stator flux and the rotor flux gene rated thereby cophasal, thus synchronizing the supply frequency of the inverter with a possible rotation of the rotor of the machine.

4. Apparatus according to claim 3, wherein the voltage supplied to the stator of the machine by the inverter is set so that the stator current generated thereby is close to the rated value thereof.

* * * * *